(12) United States Patent
Mccoy et al.

(10) Patent No.: US 12,504,811 B2
(45) Date of Patent: Dec. 23, 2025

(54) SYSTEMS AND METHODS FOR EYE TRACKING AND INTERACTIVE ENTERTAINMENT CONTROL

(71) Applicant: Sony Interactive Entertainment LLC, San Mateo, CA (US)

(72) Inventors: Charles Mccoy, San Diego, CA (US); True Xiong, San Diego, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 348 days.

(21) Appl. No.: 18/176,392

(22) Filed: Feb. 28, 2023

(65) Prior Publication Data
US 2024/0288935 A1 Aug. 29, 2024

(51) Int. Cl.
*G06F 3/01* (2006.01)
*A63F 13/67* (2014.01)
*A63F 13/79* (2014.01)
*G06F 3/16* (2006.01)

(52) U.S. Cl.
CPC .............. *G06F 3/013* (2013.01); *A63F 13/67* (2014.09); *A63F 13/79* (2014.09); *G06F 3/165* (2013.01)

(58) Field of Classification Search
None
See application file for complete search history.

(56) References Cited

U.S. PATENT DOCUMENTS

2013/0156265 A1 6/2013 Hennessy
2017/0329397 A1 11/2017 Lin
2020/0104596 A1 4/2020 Bell et al.
2020/0314524 A1* 10/2020 Querze, III ............. H04S 7/304
2022/0026986 A1* 1/2022 Ballagas ................ G06F 3/0346
2022/0215719 A1* 7/2022 Schwartz ............ G07F 17/3239
2023/0065296 A1* 3/2023 Khaleghimeybodi ......................
                                                              A61B 5/7225
2024/0281062 A1 8/2024 Benedetto

FOREIGN PATENT DOCUMENTS

WO WO-2022232422 11/2022

OTHER PUBLICATIONS

International Search Report dated May 17, 2024 in International Application No. PCT/US24/17634.
Written Opinion dated May 17, 2024 in International Application No. PCT/US24/17634.

* cited by examiner

*Primary Examiner* — Jason T Yen
(74) *Attorney, Agent, or Firm* — Fish & Richardson P.C.

(57) ABSTRACT

System, process, and device configurations are provided for eye tracking and interactive game control. A method can include detecting eye tracking data for at least one user during the presentation of the gaming content and determining a player engagement parameter for the gaming content based on the eye tracking data. Presentation of the gaming content may be updated using the player engagement parameter. Embodiments can include use of the player engagement parameter for one or more of identifying game play objects of interest, player engagement level, user effect of the gaming content, player type, player profiles and audio immersion preferences. The player engagement parameter can be used to update gaming content, audio output and control sound output for gaming content.

20 Claims, 4 Drawing Sheets

SYSTEMS AND METHODS FOR EYE TRACKING AND INTERACTIVE ENTERTAINMENT CONTROL

FIELD

The present disclosure is directed to systems and methods for eye tracking and interactive entertainment control, including electronic game control, rendering game content, gaming device operations, and gaming device processes.

BACKGROUND

Computer and console games titles have been developed in many styles for different gaming systems and platforms. As device processing increases and game play environments become more immersive, there is a desire for enhancement of content and customization of content to a user. There also exists a desire to leverage entertainment functionality to improve accessibility of content for users. One difficulty arises from rendering styles of game content, is that a menu setting or pre-programmed settings may not be suitable for all users. As such, there is also a desire for configurations that allow for increase customization based on user needs.

BRIEF SUMMARY OF THE EMBODIMENTS

Disclosed and described herein are systems, methods and device configurations for eye tracking and interactive game control. In one embodiment, a method includes controlling, by a device, presentation of gaming content, and detecting, by the device, eye tracking data for at least one user, wherein the eye tracking data is detected during the presentation of the gaming content. The method also includes determining, by the device, a player engagement parameter for the gaming content based on the eye tracking data, and updating, by the device, presentation of the gaming content using the player engagement parameter.

In one embodiment, eye tracking data includes at least one of a focus point, eye movement, eye movement speed, eye movement frequency, blink rate, pupil dilation and eye opening size.

In one embodiment, the player engagement parameter is a characterization of a player profile, wherein player profile includes at least one of an active player type, passive player type and player type in general.

In one embodiment, the player engagement parameter identifies at least one game play object of interest in the gaming content and a player engagement level with the gaming content.

In one embodiment, the player engagement parameter identifies a user effect of the gaming content.

In one embodiment, updating the gaming content includes modifying at least one of gaming content music and gaming content sound based on the player engagement parameter.

In one embodiment, updating the gaming content includes outputting sound based on display location of an object in the gaming content and a detected focus region.

In one embodiment, updating the gaming content includes adjusting sound levels of gaming content to increase sound based on display location of an object in the gaming content and a detected focus region.

In one embodiment, updating the gaming content includes adjusting sound output of gaming content to adjust a game immersion level.

In one embodiment, determining a player engagement parameter is based on a player profile and including at least one eye tracking reference.

Another embodiment is directed to a device configured for eye tracking and interactive game control. The device includes an interface configured to output gaming content, a memory storing executable instructions and a controller, coupled to the interface and memory. The controller is configured to control presentation of gaming content, and detect eye tracking data for at least one user, wherein the eye tracking data is detected during the presentation of the gaming content. The controller is also configured to determine a player engagement parameter for the gaming content based on the eye tracking data, and update presentation of the gaming content using the player engagement parameter.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1A:
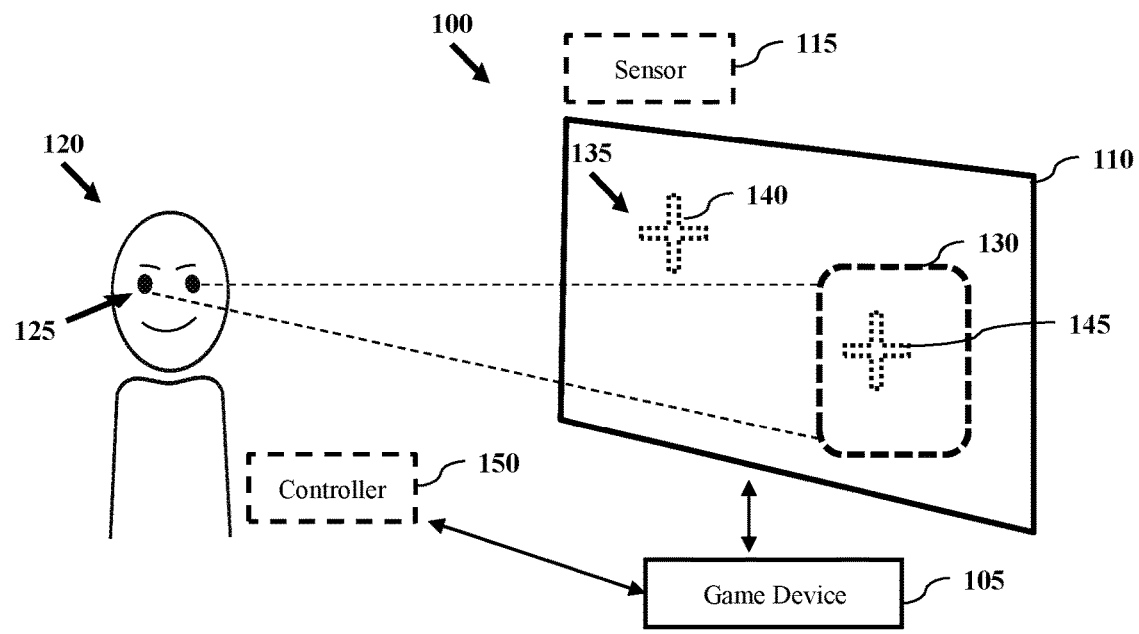
FIGS. 1A-1B are graphical representations of eye tracking and interactive game control according to one or more embodiments.

One aspect of the disclosure is directed to detecting and using eye tracking data for control and presentation of gaming content. Embodiments are directed to gaming systems which may include consoles, processors or servers that generate game media and interactive entertainment devices configured to provide output and receive user input. Embodiments are configured to use eye tracking data for one or more purposes including customization of gaming content and as a mechanism to allow for game functions to be provided to a user. In many cases, the full functionality of gaming content may not be utilized by a user. This may be due to lack of knowledge or user settings, and as a result, functions of gaming content may not be utilized. For some users, less features of gaming content, such as a reduced or narrowed audio output, may be desired. Processes, system configurations and device configurations according to embodiments are provided to allow gaming systems and media players to identify player engagement parameters for use in controlling operation of devices and output of gaming content. According to embodiments, player engagement parameters may account for a plurality of characteristics and engagement types using eye tracking data. By way of example, player engagement parameters may relate to focus, or lack of focus, on game objects to indicate a game playing style of a particular game title or for gaming content in general. Alternatively, or in combination, player engagement parameters from eye tracking data may indicate user satisfaction or engagement with gaming content. Additional player engagement parameters are discussed herein.

Embodiments described herein include processes, device configurations and systems for detecting and using eye tracking data to effect game audio. According to embodiments, configurations are provided for devices to present gaming content, and to determine one or more player engagement parameters using eye tracking data to modify sound output. Embodiments may also be used to amplify, adjust or lower, sound output of an object focused on by a user. Sound control may be updated independent of display objects based on detected eye tracking data. In addition, embodiments include operations and processes for determining and updating user profiles for output of gaming content customized for the user.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

Figure 1B:
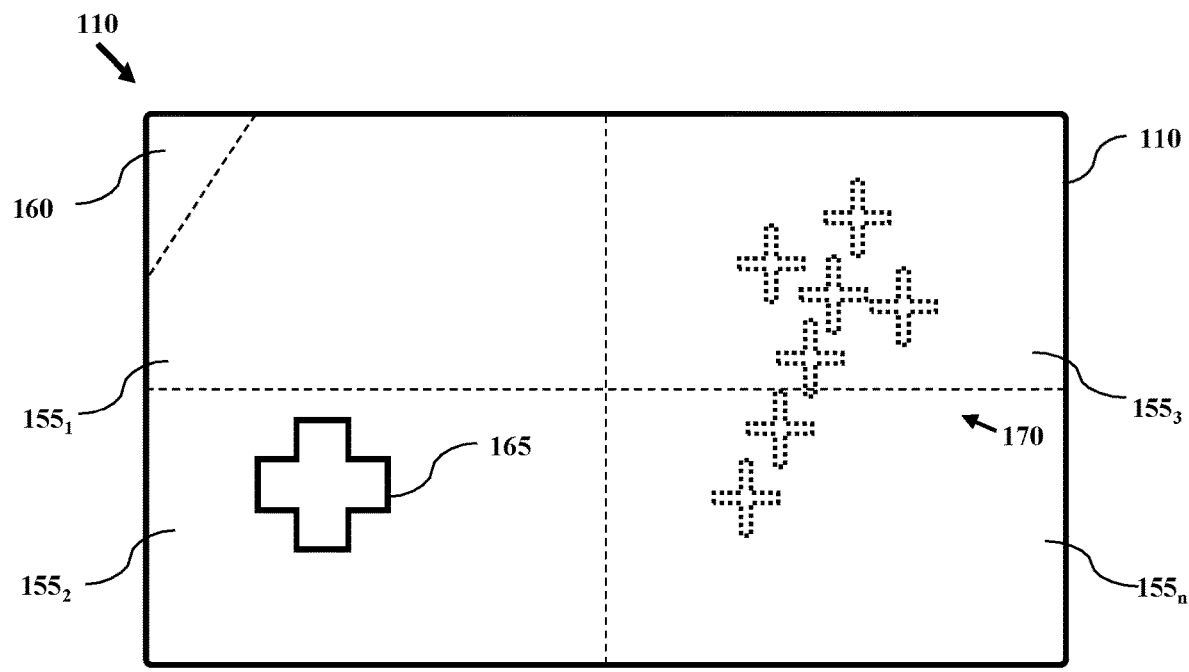

FIGS. 1A-1B are graphical representations of eye tracking and interactive game control according to one or more embodiments. FIG. 1A illustrates an exemplary system 100 including game device 105 and display 110. According to embodiments, system 100 and game device 105 are configured to detect eye tracking data for control of gaming content output to display 110. According to embodiments, system 100 may optionally include sensor 115, which may be a camera or other optical device, configured to detect and track user 120 and, in particular, eyes 125 of user 120. According to embodiments, sensor 115 may be independent from game device 105. According to other embodiments, sensor 115 may be integrated with game device 105 or display 110. Similarly, in certain embodiments, display 110 may include one or more of hardware and software elements of game device 105. Game device 105 may be a gaming console or interactive entertainment device configured to output gaming content to display 110. Game device 105 may receive input from optional controller 105.

According to embodiments, system 100, game device 105 and/or processes described herein may detect eye tracking data to assess user engagement and control or modify output of gaming content. Eye tracking data may be processed to determine interest with gaming content (e.g., focused interest, non-interest, etc.) and/or for modification of gaming content customized to a user. Accordingly, game device 105 and processes herein may detect objects associated with a user's gaze or focus. Similarly, game device 105 and processes herein may detect lack of interest with gaming content, or features of game content. FIG. 1A illustrates user 120 viewing display 110 presenting gaming content 135. Gaming content 135 may include a plurality of objects, such as object 140 and object 145. Object 145 is located in region 130, which may be identified by game device 105 based on eye tracking data from sensor 115. According to embodiments, game device 105 may identify one or more objects in gaming output with the location of a user's focus. Based on objects identified with user gaze or focus, such as object 145 and/or region 130, gaming device 105 may update gaming content output to display 110.

According to embodiments, eye tracking data can include at least one of a focus point, eye movement, eye movement speed, eye movement frequency, blink rate, pupil dilation and eye opening size. Embodiments may utilize eye tracking data to determine and update one or more player engagement parameters. Player engagement parameters may be based on a user frequency for looking away from a screen. Player engagement parameters may also be based on a location of a display screen or objects of interest on a display screen. FIG. 1B illustrates display 110. According to embodiments, game device 105 may identify one or more regions of the display, such as regions 1551-n as being associated with a user's gaze and/or focus. Game device 105 may also track objects displayed in regions 1551-n. Regions 1551-n are illustrated as an example, it should be appreciated that the region shape and number may be modified. For example game device 105 may also track user gaze and/or focus to regions, such as corner region 160 based on the eye tracking position. According to embodiments, game device 105 may identify object 165 in region 1551. Similarly, game device 105 may identify multiple objects in multiple regions, such as objects 170 in regions 1553-n. As discussed in more detail herein, detection of an object, such as object 165, using eye tracking data may allow game device 105 to control sound output based on object 165, update a player profile, modify game play and/or change a level of immersion. In one example, a player focused on object 165 can result in the game device muting or altering sound of objects 170. Embodiments, also allow for game device 105 to amplify or control sound of objects in the vicinity, hidden by and/or generally associated with object 165. Modification of the game output and sound may also incorporate player controls. In embodiments, updating of gaming output may be based on player engagement parameters and independent of a player controlled character or view. According to other embodiments, position of a player controlled character or view may be utilized with a player engagement parameter.

Content presented on a display 110, such as game content, may have one or more game objects or elements. The game objects may move position in multiple frames, and/or may be associated with a fixed position relative to one or more frames. Identification of gaming objects may include identifying one or more game elements from rendered game data or a gaming engine, and identification of position. Objects of interest may be determined based on proximity to one or more focus points determined for a user relative to display 110.

FIGS. 1A-1B are discussed with reference to gaming objects. It should be appreciated that the principles of the disclosure similarly apply to non-gaming objects and video data in general. By way of example, eye tracking data and player engagement parameters may be used for content engagement control in general. Embodiments may also be used for non-gaming applications.

Figure 2:
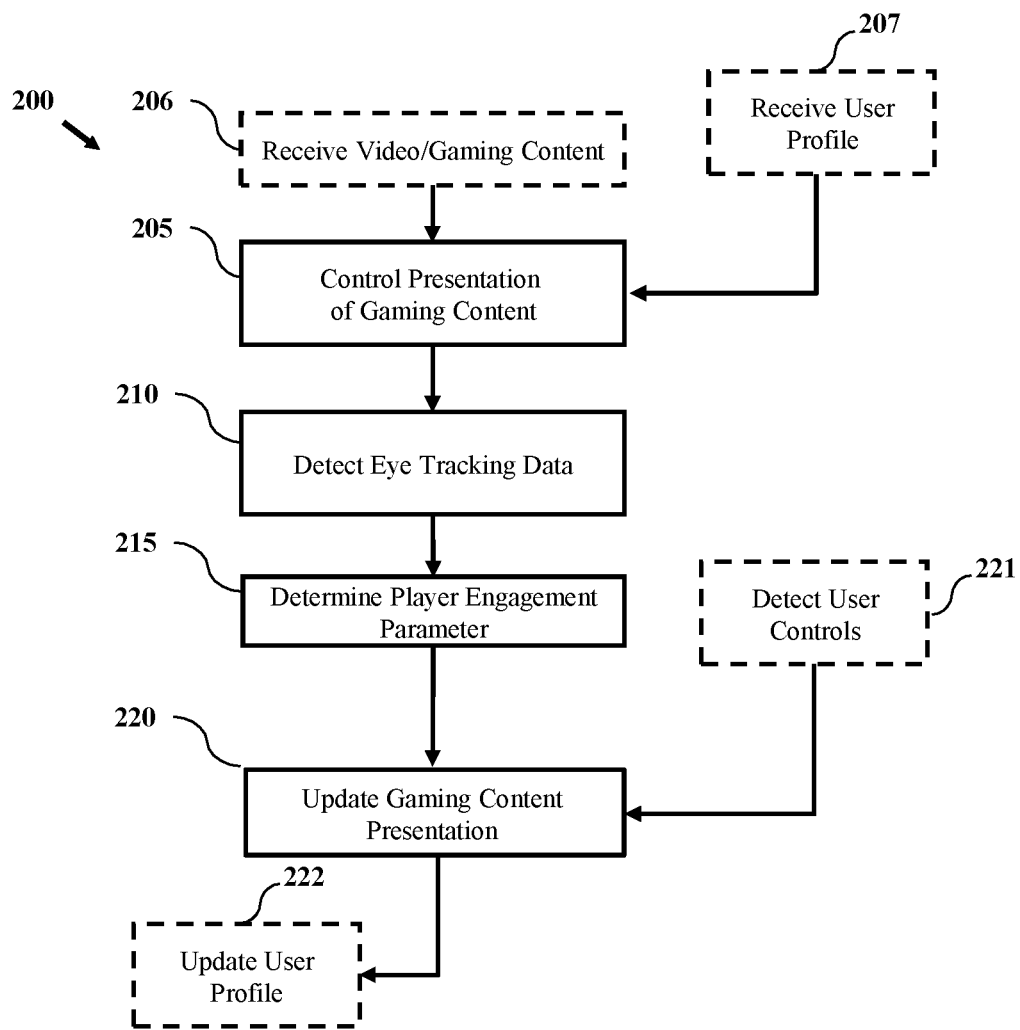
FIG. 2 illustrates a process for eye tracking and interactive game control according to one or more embodiments.

FIG. 2 illustrates a process for eye tracking and interactive game control according to one or more embodiments. Process 200 may update game presentation using eye tracking data for a user, including modifying and/or controlling presentation of content, such as gaming content, gaming video and audio output. Process 200 may be performed by a device, such as device 300 and/or controller 310 of FIG. 3, for at least one of using eye tracking data, determining player engagement parameters and updating gaming content. Process 200 may be initiated by a device (e.g., device 305) controlling presentation of gaming content at block 205. According to embodiments, gaming content may be output to a display (e.g., display 110). Processes and configurations described herein allow for eye tracking detection to identify user gaze, objects of interest, and user engagement in general.

Process 200 may include receiving gaming content at optional block 206. For example, gaming content may be received from another device or over a network connection. Process 200 may also optionally include receiving a user profile at block 207. According to embodiments, output of gaming content may be based on a user profile. A user profile may provide user preferences of gaming device output and gaming output, including game play style, audio preferences etc. Presentation at block 205 of gaming content may be based on a user profile and received data.

At block 210, process 200 includes detecting eye tracking data for at least one user. Eye tracking data may be detected for a user (e.g., user 120) controlling or playing gaming content. The eye tracking data may be detected during the presentation of the gaming content (gaming content 135). According to embodiments, eye tracking data may be detected or received from one or more peripheral devices or devices integrated with the gaming device. Eye tracking data can include at least one of a focus point, eye movement, eye movement speed, eye movement frequency, blink rate, pupil dilation and eye opening size. Eye tracking data can include parameters related to a user's eyes, and can also include parameters related to time focusing on gaming content, time looking away from gaming content, and even characteristics such as intensity of a user's gaze. For example, one or more of pupil size, eye direction and eyelid opening size may be used to infer an intent gaze or non-interested gaze. According to embodiments, a gaming device can receive eye tracking inferences and/or monitor the eye tracking data for a player to make determinations about the effect that the game is having on the player. Detecting eye tracking data at block 210 can include determining lack of focus by monitoring player eye movements. Eye movement data, such as speed, frequency, and size of eye movements, can be used in determining the state of the player. Related data from eye tracking, such as blink rate, pupil dilation, and how wide open the player's eyes are can also be determined. Detecting eye tracking data at block 210 can include determining level of stress, boredom, tiredness of the player, and/or user's level of interest in the game play. Process 200 may include using eye tracking data to correlate a player's current state with presented game play. Eye tracking data may be used to determine player engagement at block 215 which may be provided to a game title (e.g., game code, game engine, etc.), which can change the current game play to better excite the player if the player is losing interest and/or based on player preferences.

According to embodiments, detecting eye tracking data at block 210 can include processing image data of a user, such as video data of a user's eyes, to assess one or more of user state and eye characteristics. By way of example, raw eye tracking data may be processed to determine where a user is looking and other parameters, such as the amount of pupil dilation, eye movement speed, and eye opening level. The processed eye data may be correlated with media that is being presented to determine user engagement and/or interaction with the media. Displayed objects a user is paying attention to may be identified. An example of engagement data can include if a user's eyes open wider when a particular action is shown in the media. The engagement and interaction data may be used to determine updates to make to the media presentation. Engagement and interaction data can also be used to effect game play when game media is played. For example, if a user has difficulty noticing a particular type of opponent in the game, as determined based on eye tracking data detected at block 210, the game can change how the opponent is displayed. For example, more contrast may be provided to make the opponent appear more noticeable.

Figure 4:
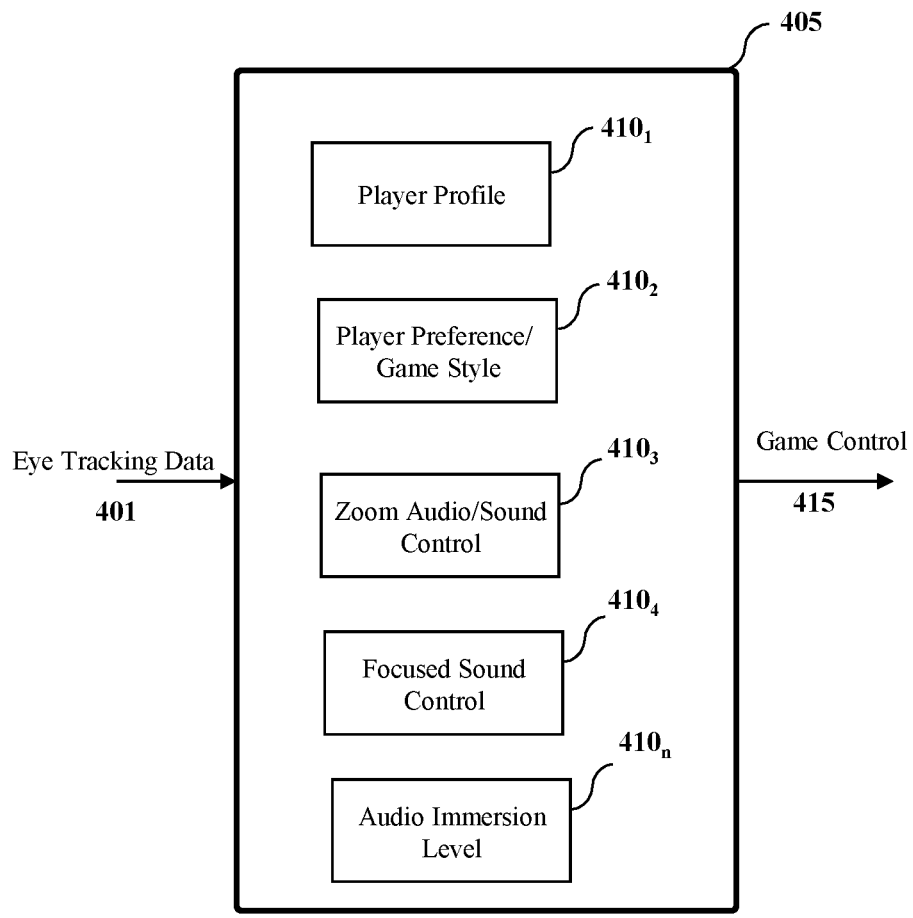
FIG. 4 illustrates a graphical representation of interactive game control functions according to one or more embodiments.

At block 215, process 200 includes determining a player engagement parameter for the gaming content based on the eye tracking data. FIG. 4 illustrates a graphical example of one or more player engagement parameters that may be utilized by process 200. A player engagement parameter may be a characterization of a player profile, wherein a player profile includes at least one of an active player type, passive player type and player characterization in general. An Active player may be interested and even excited for game play with game controls and eye tracking data indicating a high level of interest. A passive player may not have as much focus on gaming content as an active player and eye tracking data may indicate a lower level of interest. According to another embodiment, a player engagement parameter identifies at least one game play object of interest in the gaming content and a player engagement level with the gaming content. Eye tracking data may indicate an object of interest based on the amount of time an object is gazed or focused on by a user. By way of example, the object of interest may be a non-player controlled characteristic that is focused on for a period of time at least equal to or greater than a player controlled object for a period of time. Objects of interest may include regions of interest in game play data, such as a target, path, structure or obstacle a user is trying to access. A player engagement parameter may identify a user effect of the gaming content, such as an emotion (e.g., happiness, displeasure) or emotional state (e.g., excited, bored, etc.). Each of these characteristics for player engagement parameters may be used in combination or independently.

According to embodiments, determining a player engagement parameter at block 215 can include determining alertness of a player as an indicator of how engaged the user is with media being presented. For example if user eyes are drooping or the player is having trouble keeping their eyes open, process 200 may characterize the user as not engaged with the media. If user eyes do not move in response to action on a screen, process 200 may characterize the user as lacking engagement. Slow eye movements could also indicate a lack of engagement.

At block 220, process 200 includes updating presentation of the gaming content using the player engagement parameter. Updating the gaming content can include modifying at least one of gaming content music and gaming content sound based on the player engagement parameter. For player engagement parameters directed to a player profile or engagement, gaming content can be updated based on the profile or emotional state. Updating the gaming content can include outputting sound based on display location of an object in the gaming content and a detected focus region. For example, user focus on an object may include adjusting audio output of the game to highlight sound for the object. Adjustment of audio can include increasing or lowering background sound (e.g., music sound effect, etc.) and amplifying or modifying sound attributes of a focused on object. Updating the gaming content at block 220 can include adjusting sound levels of gaming content to increase sound based on display location of an object in the gaming content and a detected focus region. Updating the gaming content can include adjusting sound output of gaming content to adjust a game immersion level.

Process 200 may optionally include detecting user controls at block 221. Optionally detect user controls at block 221 may be user activation or control of a controller/input device. By detecting user controls, gaming content can be updated based on both eye tracking and user inputs via the controller. Process 200 may optionally update a user profile at block 222. A user profile may include user preferences for output of gaming content. Based on one or more of engagement and activity the profile may be updated for a gaming title. Determining a player's engagement parameter may be based on a player profile and including at least one eye tracking reference.

Figure 3:
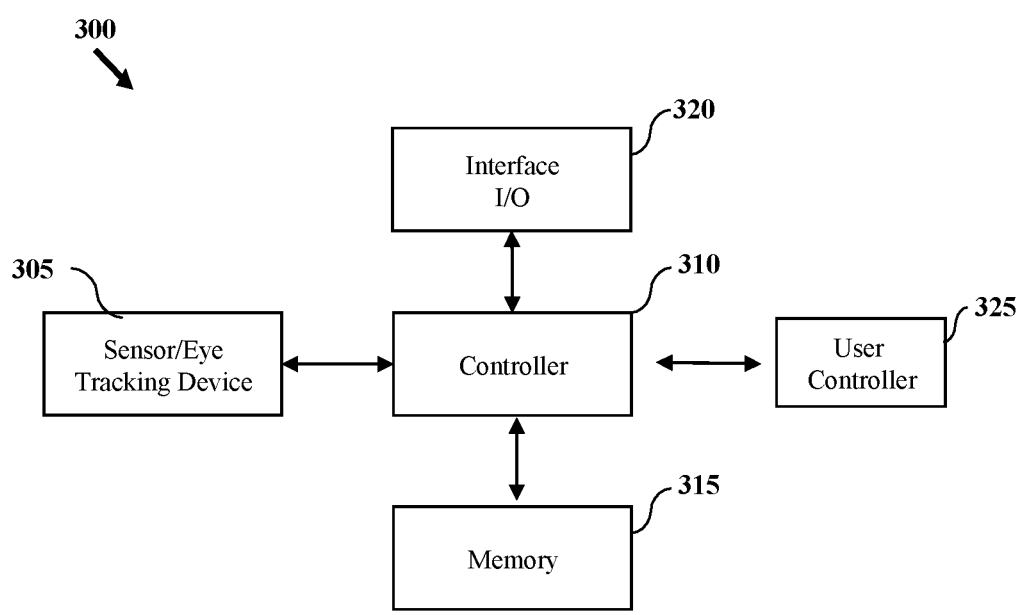
FIG. 3 illustrates a graphical representation of a device configuration according to one or more embodiments.

FIG. 3 illustrates a graphical representation of a device configuration according to one or more embodiments. Device 300 provides a configuration for a device configured for eye tracking and interactive game control (e.g., game device 105) and may relate to a gaming console, media device, and/or handheld device. Device 300 may be configured to present and update gaming content using one or more player engagement parameters. According to embodiments, device 300 includes sensor/eye tracking device 305, controller 310, and memory 315. Device 300 may also include an interface (e.g., network communication module, input/output (I/O) interface) 320. Device 300 may receive input from a game controller 325. Device 300 may output gaming content to a display using interface 320.

Controller 310 may relate to a processor or control device configured to execute one or more operations (e.g., executable instructions) stored in memory 315, such as processes for updating gaming content. Memory 315 may be non-transitory memory configured to provide data storage and working memory operations for device 300. Memory 315 may be configured to store computer readable instructions for execution by controller 310 for one or more processes described herein. Interface 320 may be a communications module configured to receive and transmit network communication data.

Device 300 may be configured to receive gaming media (e.g., card, cartridge, disk, etc.) and output visual and audio content of the gaming media to a display. For network games, device 300 may receive game data from a network source. Device 300 may be configured to receive input from one or more peripheral devices, such as sensor 305 and user controller 325.

Controller 300 may be configured to control presentation of gaming content, and detect eye tracking data for at least one user. Controller 300 may also be configured to determine one or more player engagement parameters for the gaming content based on the eye tracking data, and update presentation of the gaming content using the player engagement parameter.

FIG. 4 illustrates a graphical representation of interactive game control functions according to one or more embodiments. According to embodiments, one or more player engagement parameters may be determined for a user based on eye tracking data. Controller 405 of a game device is configured to receive eye tracking data 401 for determining one or more player engagement parameters 4101-*n*. Based on the player engagement parameter, controller 405 may adjust or modify game output. By way of example, operations to output a sound or sounds may be adjusted based on the player engagement parameter. Controller 405 may generate game control signals based on one or more of player engagement parameters 4101-*n*.

According to embodiments, a player engagement parameter may include parameter for a player profile 4101. A game device may use a player profile for settings or attributes of a game that may be modified. The player profile may include settings for active play, passive play, play associated with a type of game, preferred difficulty, etc. Eye tracking data of a player playing gaming content may be analyzed by controller 405 to determine information about how the player interacts with the game. Player interactions can be detected to determine a type for the player. For example, a player profile may be generated or updated for a user to identify one or more player types such that the player profile can be used to control gaming content audio during game play. A player profile may include a determination for a player relative to a scale of passive player vs active player. Analysis of eye tracking data can be used in this determination. For example, some players are motivated by fast paced difficult combat as an example of active player category, while other players may enjoy a slower exploration of the game environment and may wish to avoid combat as an example of a passive player category. Output of game content for music played for a player identified as an active player can be at a higher tempo than music played for a player identified as a passive player. The player type determination can be based on a pre-defined determination and/or determinations made in real time while analyzing the player while playing the game. Real time game play can start with base-line audio settings until a player type is identified by analyzing the player during their game play. According to embodiments, a player type determination can be obtained from a player profile before game play begins for a new title. According to embodiments, analysis of a player during their game play may determine that a current engagement level/playing style is different than a player type in the player profile or a previous determination of player type. A user can update their profile to set the player type they wish to be associated with. Overrides for particular game titles may also be allowed.

According to embodiments, a player profile can include objects of interest to a user. Based on eye tracking data, objects that a player focuses on while playing can provide information about the player and what they enjoy in a game play session. Embodiments include observing patterns in objects that a player focuses on to determine player interests. These determinations can be added to a player profile so that game titles can tailor their game play to the player's interests. The audio in a game can be influenced by the players interests, such as choosing a style of music that is consistent with the types of objects that the player is most interested in.

According to embodiments, a player engagement parameter can include player preferences and game style parameters 4102. Embodiments can include determining player preferences from eye tracking data. For example, a controller can determine if a player style or interest differs in one or more game play scenarios. For example, a player may have a different play style while in combat than they do when they are exploring the game world. Embodiments can include determining musical preference of a user by observing the effect that different styles of music have on how the player plays. This information can be used to choose more music in the game in audio styles that have been identified as being enjoyed by the user. In some game situations, the music chosen may be chosen to be less enjoyable to the player. For example, if the character in the game is captured and held prisoner, then the music choice selection for a game may be generated with a style that avoids music preferred by the user.

Player engagement parameters can be determined by a controller monitoring the eye tracking data for one or more users to make determinations about the effect that the game is having on a user. The controller can monitor lack of focus by monitoring player eye movements. Eye movement data, such as speed, frequency, and size of eye movements, can be used in determining the state of the user. Related data from eye tracking, such as blink rate, pupil dilation, and eye opening width can also be monitored. Monitoring of eye tracking data can determine one or more of stress level, boredom, and tiredness of a user and user level of interest in the game play. Monitored data may be used by a controller to correlate user state with game play. This information can be fed back to the game title, which can change the current game play to better excite the player if the player is losing interest. Player profile information and preferences can be built up across multiple game play sessions across multiple game titles. In addition, player profile information may be augmented by or overridden by preferences explicitly specified by the player.

According to embodiments, a player engagement parameter can include zoom audio/sound control parameters 4103. Zoom audio may be a sound control parameter such that a controller detecting, from eye tracking data, that a player is focused on a particular game object or objects, the audio from that game object can be enhanced (e.g., raised, filtered, accentuated, etc.) relative to other game audio. For example, by enhancing audio from a game object that is focused on, a user may determine which audio source is associated with a particular game object. Different players may have different audio setups, such as audio coming from TV speakers that do not provide directional information, or a high-end surround sound system, or headphones. Some players may have hearing impairments, which may make it more difficult to tell which game objects are associated with which sounds in the game audio. According to embodiments, a controller may control the game to display a highlight on or around an object that the player is focused on in order to provide feedback to the user as to which object the game considers to be in focus. According to embodiments, different forms of highlighting can be used if the object in focus has an associated audio source, such as using a different color, adding an icon to indicate sound, or adding animated sparkles. A controller may also be configured to enhance or modify audio based on a region of a display screen associated with an object. For example, when the controller detects a user focusing on an object, such as a door, which has audio sources bleeding through it from the other side of the object, then audio sources from the other side can be enhanced. As such, user can focus on objects in game (e.g., a door, barrier, scenery, portal etc.) to listen for what sounds are on the other side of the door.

According to embodiments, a player engagement parameter can include focused sound control parameters 4104. Focused sound control parameters 4104 can allow for making sounds from focused object stand out. By way of example, when a controller detects user focused on a particular game object, the audio associated with that game object can be enhanced to stand out from the other game audio. This can be done by playing the audio associated with the game object at a louder volume level and/or playing other game audio at a lower level. Focused sound can include adjusting a first audio source to stand out against other audio based on an analysis of the first audio source to determine the frequency components of the first audio source. Similar frequencies in other audio sources can be reduced so that there is less audio competing in the frequencies used by the first audio source, thus making the first audio source easier to hear clearly. Focused sound may allow for other frequencies of the other audio sources to not be affected, so that the overall audio will have a more uniform feel. By way of example, if game content includes music with a deep bass beat, that bass beat could remain unaffected when the player is focusing on hearing what another character in the game is saying, since the other character voicings do not contain deep bass frequencies. As such, the deep bass beat will not need to be modified to avoid conflicting with the other character voicings.

A controller may be configured to provide focused sound such to reduce the directionality of sounds. For example, for game audio configured with a surround sound configuration (e.g., 360° around a user), the sounds coming from similar directions to the direction of the audio from the focused game object can be reduced, while audio from significantly different angles may not need to be adjusted to be differentiated from the audio from the focused game audio. Such a technique would work well for a user with an audio setup that allows them to easily determine the direction that audio is coming from, while it might not be effective for a player with an audio system or hearing impairment that prevents them from easily determining what direction audio is coming from. Player profile information can indicate the degree to which a player can determine the direction that audio is coming from, which can be used to determine if this technique would be good for enhancing audio from a game object for that player. According to embodiments, a player profile can give more information about hearing impairments that a player has, which can be taken into account when determining the method to use when enhancing the audio from a game object to make it stand out for the player, along with the amount of adjustment that will be effective.

According to embodiments, a controller may be configured to adjust ambient sounds for focused sound control. Some game sounds may be ambient sounds while other game sounds may be associated with game events. When adjusting the game audio, reducing the ambient sounds would reduce the feeling of immersion in the game environment, but reducing game sounds that are associated with game events may prevent the player from getting important information from the audio. A controller may be configured to reduce the volume of other game audio associated with ambient sounds, while letting sounds associated with game events come through. In some cases, if audio that is associated with a game event is reduced, then a visual indication can be given to prevent the player from missing important information that they otherwise have received through the game audio.

According to embodiments, a player engagement parameter can include audio immersion level parameters 410n. Audio immersion level parameters 410n can allow for controlling a level of game immersion. Some users may prefer a higher level of audio isolation for a game object that is focused on compared to other users. Similarly, some users, such as those with a hearing impairment, those in a busy environment, or those with attention deficit disorder or autism that may be overwhelmed or distracted by too much ambient noise, may benefit from a reduced level of immersion while playing. Other players may want as much immersion in the game environment as possible. A controller may be configured to receive user input on the level of immersion by way of a player profile. The player profile can allow the user to specify immersion level overrides on a game title basis. The system or game title may allow the player to specify the desired immersion level for a particular game play session. The controller is configured to reduce the immersion level, such that ambient game sounds can be reduced to allow the player to focus on other game audio. Audio associated with game events, such as an explosion in the distance, should not be significantly reduced since that game audio communicates important information about the state of the game to the player. By reducing the ambient game sounds, audio associated with game events will be more easily noticed.

Figure 5:
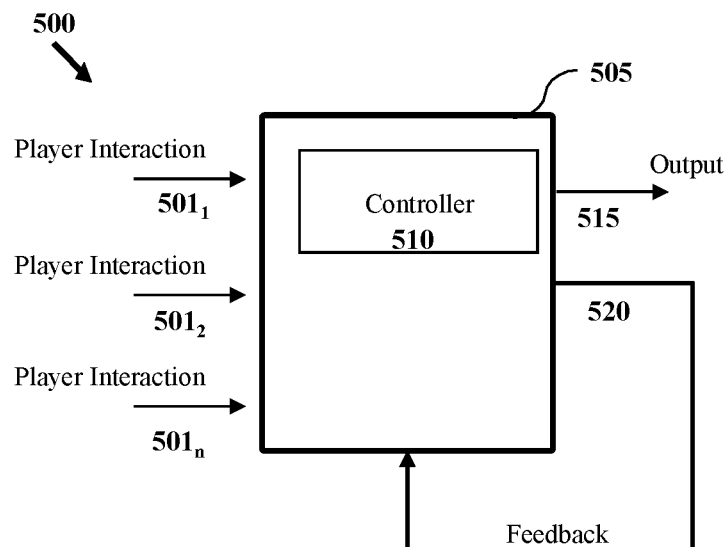
FIG. 5 illustrates a graphical representation of game control training according to one or more embodiments.

FIG. 5 illustrates a graphical representation of game control training according to one or more embodiments. According to embodiments, player engagement parameters may be performed determined using one or more references and models. Information for a user, including user habits, reactions and eye tracking data may be determined based on a training process. In addition, a profile may be determined for each user. FIG. 5 illustrates training process 500 which can include receiving plyer interactions 5011-n as training input by a device 505 including a controller 510. According to embodiments, controller 510 may receive a plurality of interactions for one or more game titles as training input. In embodiments, player interactions 5011-n may include eye tracking data detected during presentation of gaming content. Based on the training in process 500, controller 510 may generate output 515. Output 515 may include one or more game output parameters, such as modifications to sound output, updates to graphical elements and changes in game play style. According to embodiments, controller 510 may be configured to generate output 515 based on a recursive loop including training and feedback. Feedback loop 520 may provide information such as ratings and accuracy for output 515.

According to embodiments, training process 500 and controller 510 may be configured to use one or more learning models (e.g., artificial intelligence, iterative models, etc.) to utilize eye tracking data. Training process 500 and controller 510 may use one or more libraries of common response. According to embodiments, output 515 may include output of gaming content with modified parameters, including modified sound output and/or modified gaming content.

While this disclosure has been particularly shown and described with references to exemplary embodiments thereof, it will be understood by those skilled in the art that various changes in form and details may be made therein without departing from the scope of the claimed embodiments.

What is claimed is:

1. A method for eye tracking and interactive game control, the method comprising:
   controlling, by a device, presentation of gaming content;
   detecting, by the device, eye tracking data for at least one user during the presentation of the gaming content;
   identifying a game object within a detected focus region of the gaming content based on the eye tracking data;
   enhancing an audio source associated with the identified game object based on a player profile associated with the at least one user;
   determining, by the device, a player engagement parameter for the gaming content based on the eye tracking data; and
   updating, by the device, presentation of the gaming content using the player engagement parameter.

2. The method of claim 1, wherein the eye tracking data includes at least one of a focus point, eye movement, eye movement speed, eye movement frequency, blink rate, pupil dilation and eye opening size.

3. The method of claim 1, wherein the player engagement parameter is a characterization of the player profile, and wherein the player profile includes at least one of an active player type, passive player type and player type in general.

4. The method of claim 1, wherein the player engagement parameter identifies the game object of interest in the gaming content and a player engagement level with the gaming content.

5. The method of claim 1, wherein the player engagement parameter identifies a user effect of the gaming content.

6. The method of claim 1, wherein updating the gaming content includes modifying at least one of gaming content music and gaming content sound based on the player engagement parameter.

7. The method of claim 1, wherein updating the gaming content includes outputting sound based on a display location of the game object in the gaming content and the detected focus region.

8. The method of claim 1, wherein updating the gaming content includes adjusting sound levels of the gaming content to increase sound based on a display location of the game object in the gaming content and the detected focus region.

9. The method of claim 1, wherein updating the gaming content includes adjusting a sound output of the gaming content to adjust a game immersion level.

10. The method of claim 1, wherein determining the player engagement parameter is based on the player profile and at least one eye tracking reference.

11. A device configured for eye tracking and interactive game control, the device comprising:
    an interface configured to output gaming content;
    a memory storing executable instructions; and
    a controller coupled to the interface and the memory, wherein the controller is configured to:
    control presentation of the gaming content,
    detect eye tracking data for at least one user, wherein the eye tracking data is detected during the presentation of the gaming content,
    identify a game object within a detected focus region of the gaming content based on the eye tracking data,
    enhance an audio source associated with the identified game object based on a player profile associated with the at least one user,
    determine a player engagement parameter for the gaming content based on the eye tracking data, and
    update presentation of the gaming content using the player engagement parameter.

12. The device of claim 11, wherein the eye tracking data includes at least one of a focus point, eye movement, eye movement speed, eye movement frequency, blink rate, pupil dilation and eye opening size.

13. The device of claim 11, wherein the player engagement parameter is a characterization of the player profile, wherein the player profile includes at least one of an active player type, passive player type and player type in general.

14. The device of claim 11, wherein the player engagement parameter identifies the game object of interest in the gaming content and a player engagement level with the gaming content.

15. The device of claim 11, wherein the player engagement parameter identifies a user effect of the gaming content.

16. The device of claim 11, wherein updating the gaming content includes modifying at least one of gaming content music and gaming content sound based on the player engagement parameter.

17. The device of claim 11, wherein updating the gaming content includes outputting sound based on a display location of the game object in the gaming content and the detected focus region.

18. The device of claim 11, wherein updating the gaming content includes adjusting sound levels of the gaming content to increase sound based on a display location of the game object in the gaming content and the detected focus region.

19. The device of claim 11, wherein updating the gaming content includes adjusting a sound output of the gaming content to adjust a game immersion level.

20. The device of claim 11, wherein determining the player engagement parameter is based on the player profile and at least one eye tracking reference.

* * * * *